Jan. 31, 1961 — E. PFARRWALLER — 2,969,692
CAM DRIVE
Filed March 30, 1959 — 3 Sheets-Sheet 1

INVENTOR.
ERWIN PFARRWALLER.
BY K. B. Mayr
ATTORNEY.

Jan. 31, 1961  E. PFARRWALLER  2,969,692
CAM DRIVE
Filed March 30, 1959  3 Sheets-Sheet 3

INVENTOR.
ERWIN PFARRWALLER.
BY
ATTORNEY.

United States Patent Office 2,969,692
Patented Jan. 31, 1961

2,969,692

CAM DRIVE

Erwin Pfarrwaller, Winterthur, Switzerland, assignor to Sulzer Freres, S.A., Winterthur, Switzerland, a corporation of Switzerland Filed Mar. 30, 1959, Ser. No. 802,975

Claims priority, application Switzerland Mar. 31, 1958

8 Claims. (Cl. 74—567)

The present invention relates to a system of irregularly driving a mass by means of at least one cam surface and one cam follower and an apparatus for practicing the method.

When driving a mass by means of a cam and a cam follower the direction of the force acting on the mass is changed at certain portions of the cam surface whereby the direction of the force acting on the cam follower is changed. In a drive of this type, particularly, if the cam follower is connected to the mass by means of one or more intermediate elements, a clearance must be provided at the joint pivots and bearing pins and the like of the linkage between the cam follower and the mass to afford undisturbed movement of the elements.

At a certain direction of the driving force acting on the mass the pivots and pins abut a certain part of their bearings. If the direction is reversed, abutment occurs at the diametrically opposite surface portions of the pivots, pins and bearings whereby the relative position of these elements is changed depending on the available clearance. This causes a lengthening or shortening of the overall length of the linkage. The change of length is augmented, if the elements of which the linkage is composed include or abut against elastically deformable elements. Elastic deformations have a doubling effect on the length of the linkage at a reversal of direction of the force which causes a compression as long as it acts in one direction and an elongation when it acts in the opposite direction.

Since the dimensional changes of the individual joints and/or links and other parts of the linkage between the cam follower and the mass are added, the mass may be displaced to an undesirable extent, causing knocking and vibration.

In order to avoid the aforedescribed undesired effects of conventional cam drives the invention proposes to interpose a movement in the movement of the mass at a change of direction of the driving force acting on the mass whereby the mass may continue its initial movement while the driving elements are moved adversely or counter to the new force direction to an extent partly or wholly corresponding to changes of dimension of the linkage due to its clearances.

In the device according to the invention the portion of the cam surface on which rests the cam follower when subjected to the new force direction is offset relatively to the portion of the cam surface preceding the change of direction of the force, the offset extending in a direction counter to the new force direction and amounting to at least a portion of the dimensional change of the linkage between the cam follower and the mass. This dimensional change may be expressed in percent of the path of the mass between two extreme positions whereby the offset amounts to the same percentage of the path of the cam follower between two extreme positions.

The novel features which are considered characteristic of the invention are set forth with particularity in the appended claims. The invention itself, however, and additional objects and advantages thereof will best be understood from the following description of embodiments thereof when read in connection with the accompanying drawing, in which:

Figure 1:
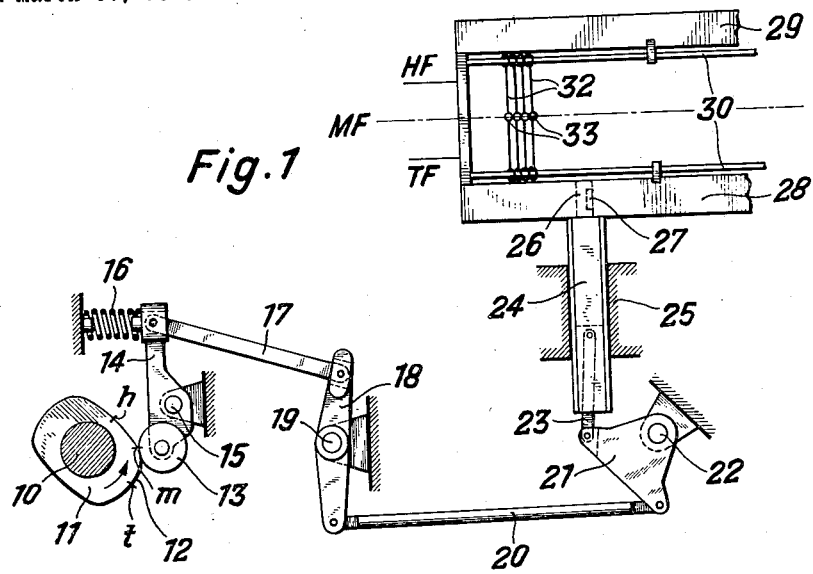
Fig. 1 is a diagrammatic illustration of a cam drive according to the invention as applied to a shedding mechanism of a loom for weaving.

Referring more particularly to Fig. 1 of the drawing, numeral 10 designates a shaft carrying a cam 11 driven by a main loom shaft, not shown. The surface 12 of the cam 11 acts on a follower roller 13 mounted on one arm of a two-arm lever 14 which swings on a pivot 15. A compression spring 16 acts on the second arm of the lever 14 for assuring engagement between the roller 13 and the cam surface 12.

One end of a link 17 is pivoted to the second arm of the lever 14, the second end of the link being pivoted to one end of a two-arm lever 18 swinging on a pin 19. The second end is connected to an elbow lever 21 by means of a link rod 20. The lever 21 swings on a pin 22 and actuates through a link 23 a platen 24 guided for linear up and down movement by a guide 25. The platen 24 has a hook 26 at its upper end. The hook is engaged by a correspondingly shaped receiver 27 in the lower horizontal beam 28 of a heddle frame which beam is rigidly connected by uprights to an upper beam 29. The beams support shaft staves 30 carrying heddles 32 having eyes 33.

The heddle frame 28, 29 is shown in mid position in which the eyes 33 are in a middle position and the shed is closed, if the other heddle frame are also in mid position. When picking a weft thread, the frame 28, 29 is either in the raised position whereby the eyes 33 are at the elevation HF or in the lowered position whereby the eyes 33 are at the elevation TF.

Figure 2:
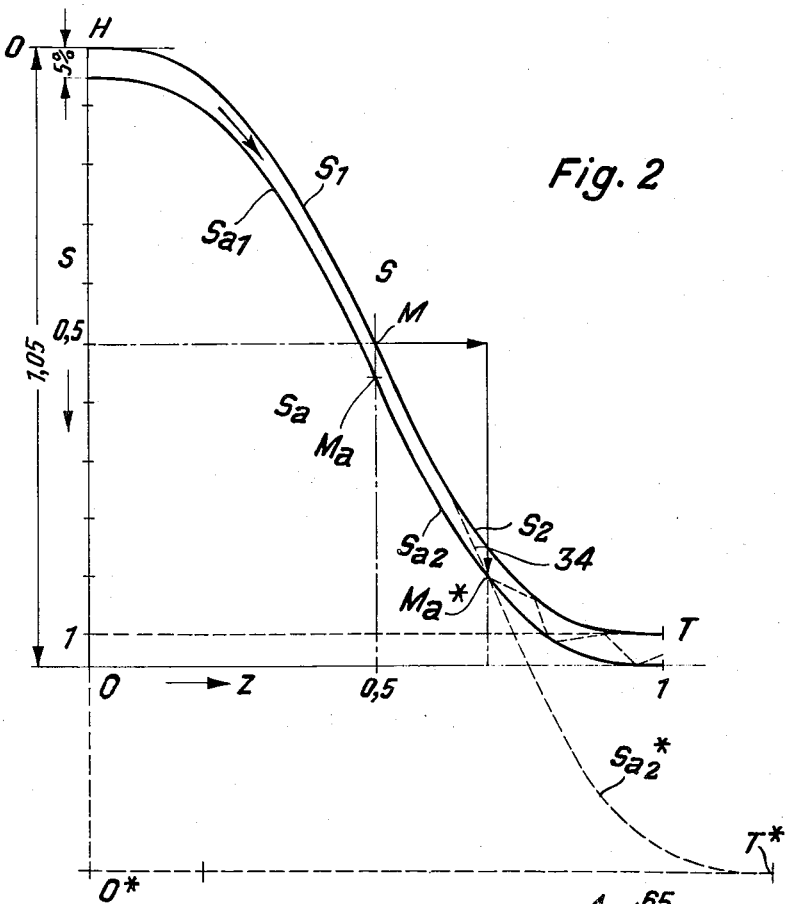
Fig. 2 is a diagram illustrating the path of the mass to be moved relatively to time.

Fig. 2 is a diagram showing the positions of the moving mass at different times $z$. The mass must be accelerated for leaving the position H and must be decelerated to come to rest at the position T. Barring special conditions for different portions of the path $s$ of the mass, it is assumed that the mass is accelerated during $0.5s$, i.e., up to the moment the mass is in the position M and is thereupon retarded so that at the point M the driving force changes from positive to negative.

The frame 28, 29, which represents the mass to be moved in the example shown in Fig. 1, is in mid position and has traveled from 1 to $0.5s$. The roller 13 has thereby traveled along the cam surface 12 from $h$ to $m$ (Fig. 1). While the frame 28, 29 is accelerated to move from raised to lowered position, the levers 14, 18 and 21 move counterclockwise, a tension force is applied to the links 17 and 23 and to the platen 24 with the hook 26, and the rod 20 is compressed. This movement is guided because the roller 13 is pressed outwardly by the cam 11.

The path of the frame 28, 29 is represented by the upper portion $S_1$ of the curve S.

The movement of the frame 28, 29 is retarded between mid position and lowered position when the roller 13 runs along the part $m$—$t$ of the cam surface 12. When traveling through the path portion $S_1$ (Fig. 2) the frame is pulled down and the upper end of the hook 26 rests on the hook receiver 27. The frame moves at its maximal speed when reaching mid position. Thereupon the frame is retarded which is possible only by changing the direction of the actuating force so that, instead of pulling, the hook 26 presses on the frame.

To produce this pressure force the cam 11 would have to pull on the roller 13. This is only possible with a grooved cam. The spring 16, however, is so strong that it produces the necessary force for resisting the high speed downward movement of the frame. The levers 14, 18, 21 continue to swing counterclockwise, the links 17 and 23, the platen 24 and the hook, however, are compressed and a pull is exerted on the rod 20 by the inertia of the frame.

It is assumed that the clearance at all pivots, pins and bearings of the linkage 13 to 27 amounts to 5% of the stroke of the frame 28, 29. If there would be no clearance and no elastic deformation, the path of the mass of the frame 28, 29 between M and T in Fig. 2 would be represented by the lower portion $S_2$ of the curve S. Since a clearance in the linkage connecting the follower 13 to the mass 28, 29 is unavoidable, the latter does not move on the lower curve portion $S_2$. Because of its inertia, the frame 28, 29 retains its initial speed and direction of movement and moves on a straight line 34 which intersects the curve $Sa_2$ at the point $Ma^*$.

Since the mass 28, 29 moves freely within the limits permitted by the clearances of the linkage, the hook receiver 27 catches the hook 26 at the point $Ma^*$. At this time the velocity of the mass 28, 29 is greater than that of the linkage because the latter has already been retarded due to the configuration of the cam surface 12. This produces a knock of the hook receiver 27 on the hook 26 and a bouncing back so that the frame follows the zigzag line between the curves $S_2$ and $Sa_2$ shown in Fig. 2.

This zigzag movement does not only cause knocks and disturb the movement of the frame 28, 29 but may cause vibration of the entire loom. These disturbances not only cause noise but may cause irregularities of the elements supported by the frame 28, 29 and warp thread failures.

If the mass 28, 29, after passing point M, would move along the curve $Sa_2$ instead of along the curve $S_2$, knocks or vibrations would be avoided while the mass is decelerated between the points M and T.

The vertical distance between the curves S and Sa is 5% of the total stroke of the mass. If the frame 28, 29 would be located at Ma instead of at M at the time 0.5 the mass of the frame would be decelerated along the curve $Sa_2$ and there would be no knocks.

If the follower runs in a groove only the clearance between the follower and the guide surfaces of the groove would be effective and the transition from M to Ma would be zero, at least theoretically. For all practical purposes the extent of this transition depends on the configuration of the transition portion of the cam groove.

If, as in the mechanism shown in Fig. 1, the sum of all clearances and deformations in a multi-element linkage must be counteracted, a much greater intermediate transition portion must be interposed between the accelerating and decelerating parts of the cam surface. The velocity of the mass and of its driving element must be exactly alike at the point $Ma^*$ where the mass meets its driving element. This is the case, if the straight line 34 of the path of the mass continues from point $Ma^*$ into a path $Sa_2^*$ which has the same configuration as the path portion $Sa_2$. The tangent to the curve Sa at the point Ma has the same inclination as the tangent to the path curve S at point M which intersects the curve $Sa_2$ at the point $Ma^*$.

Because of the interposed portion M—$Ma^*$ the distance O—H is increased to $O^*$—H and the base O—T is increased to $O^*$—$T^*$. Since the stroke of the frame must not be changed, the curve H—$T^*$ must be reduced to the stroke of the frame plus the total clearance of 5% of the stroke and the time abscissa must not be longer than $z=1$ in Fig. 2. This is done by drawing the lines 41, 42 in Fig. 3.

Figure 3:
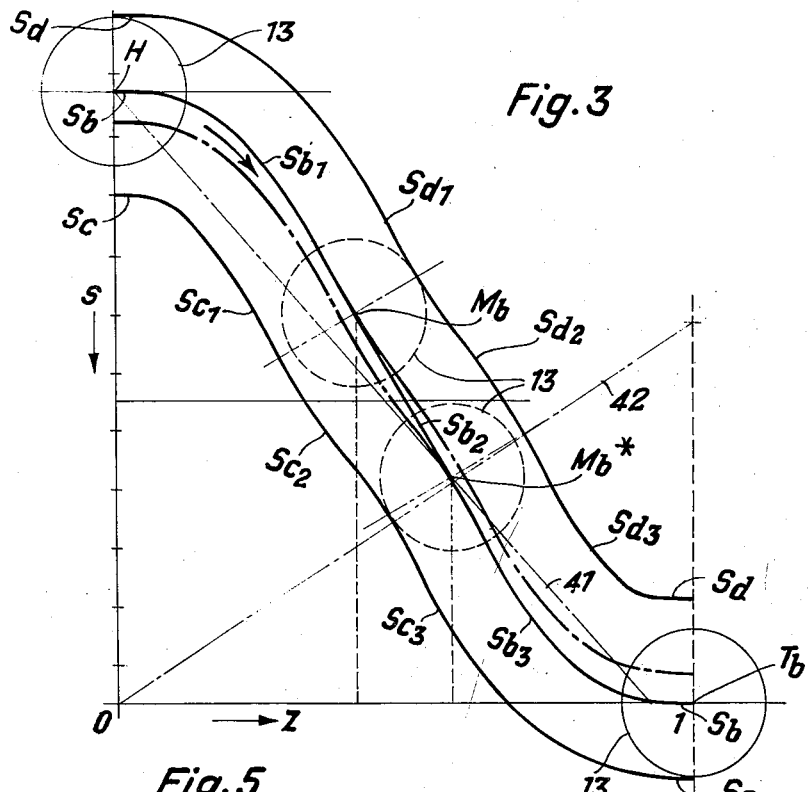
Fig. 3 is a similar diagram in which the curve shown in Fig. 2 is reduced to the path of the mass plus the clearances in the linkage between the cam follower and the mass and showing the offset of the cam surface decelerating the mass relatively to the cam surface accelerating the mass.

Fig. 3 teaches how to shape the portion $h$—$t$ of the cam surface 12 which portion corresponds to the path Sb between the points H and Tb in Fig. 3. The mass is accelerated on the path $Sb_1$ and is retarded along the path $Sb_3$. Between the paths $Sb_1$ and $Sb_3$ is an intermediate cam surface portion $Sb_2$ extending between the points Mb and $Mb^*$. Since this intermediate portion is tangent to the end of the portion $Sb_1$ at Mb and is tangent to the beginning of the portion $Sb_3$ at point $Mb^*$ there is no knocking when the direction of the force acting on the mass is changed.

Fig. 3 shows the roller 13 in solid lines at the beginning H, at the end Tb and in dotted lines at the points Mb and $Mb^*$. The outer curves Sc and Sd show that the roller engages the cam surface during the acceleration as well as during the deceleration period. Fig. 3 also shows that at the time the direction of the force acting on the mass is reversed a portion $Sc_2$, $Sd_2$ is interposed in the path of the mass beginning at the ends of the curves $Sc_1$ and $Sd_1$. The interposed portion permits the mass, i.e. the frame 28, 29, to retain the speed and direction of movement it had at point Mb while the mass moves on a straight path $Sb_2$. At the same time the driving elements, cam surface 12 and roller 13 in Fig. 1, produce a movement counter to the new direction of the force, the extent of the movement corresponding to the dimensional change of the linkage permitted by the clearances thereof.

During the acceleration period the roller 13 is pressed toward the right and upward in Fig. 1 so that the roller moves on the path $Sb_1$. During deceleration the roller moves on the path $Sb_3$. The new force is produced at the mass end of the linkages and acts downward to the left. The curve $Sb_3$ is offset relatively to the curve $Sb_1$ according to the total clearance of the linkage which clearance amounts to 5% of the stroke of the frame. This offset is effected between the points Mb and $Mb^*$. If it is desired to counteract only a portion of the clearance the straight line $Sb_2$ is shorter. The offset must be reduced according to the ratio between the stroke of the cam follower and that of the frame 28, 29.

Figure 4:
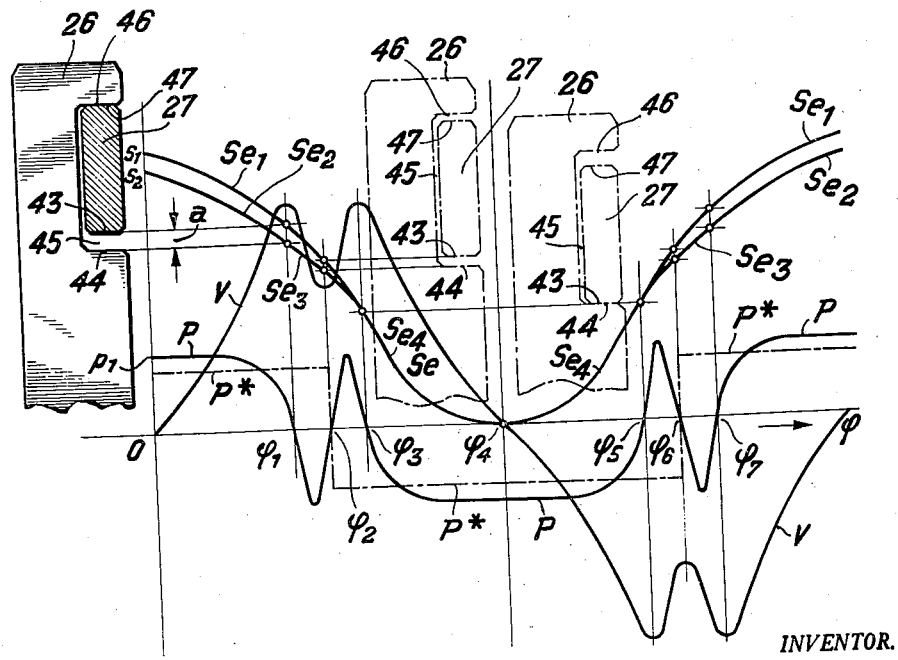
Fig. 4 is a diagram showing the acceleration and the deceleration as well as the path of the mass and of its driving element.

Fig. 4 shows the movements of the frame 28, 29 whose mass acts on the hook receiver 27. The hook 26 on the end of the platen 24 is the last element of the linkage 14—26 which is interposed between the cam follower roller 13 and the hook receiver 27. Between the lower face 43 of the latter and the lower edge 44 of the recess 45 of the hook 26 is a clearance $a$ which represents the total of all clearances which are needed in the articulations and bearings of the linkage 14—26 to assure satisfactory operation, and also all elastic deformations of the elements of which the linkage is composed.

The curve P in Fig. 4 represents the acceleration force during up and down movement of the frame 28, 29 from which results the velocity V of the movement of the frame 28, 29. The curve Se represents the path of the mass of the frame.

At the point O of the diagram, Fig. 4, the frame is in the raised position, the eyes of the heddles being at the elevation HF (Fig. 1). The roller 13 engages point $h$ of the cam surface 12. If the frame moves downward, its acceleration amounts to $p_1$.

The heddle frame can be driven by the cam 11 only if the upper edge 46 of the recess 45 of the hook 26 rests on the upper surface 47 of the hook receiver 27. The distance between the face 43 of the hook receiver and the lower edge 44 of the recess amounts to $a$ which is equal to the total linkage clearance $s$ in Fig. 2.

The curve $Se_1$ represents the path of the lower face 43. The path of the edge 44 begins at $s_2$ which is below and spaced to the extent $a$ from the starting point $s_1$ of the curve $Se_1$. The space $a$ is not changed at the beginning of the movement so that the vertical distance between the curves $Se_1$ and $Se_2$ remains equal to $a$.

At the angular position $\varphi_2$ of the cam 11 the direction of the force acting on the mass is changed. The frame 28, 29 which has been accelerated during its movement from HF to MF must be retarded during its movement from MF to TF (Fig. 1).

This deceleration is initiated by the cam surface 12 but can act on the frame 28, 29 no sooner than the hook receiver 27 has moved relatively to the hook 26 by the distance $a$ and the face 43 rests on the edge 44. The mass of the frame 28, 29 continues to move at its previous velocity during the movement through the distance $a$.

Instead of decelerating the linkage from the moment of change of direction of the driving force, the invention provides a period $\varphi_1$ to $\varphi_3$ during which the acceleration before $\varphi_1$ is stopped and a deceleration is effected which is followed at $\varphi_2$ by a new acceleration whereupon at $\varphi_3$ a deceleration corresponding to the reversal of the direction of the driving force is effected by the cam surface 12.

The deceleration and acceleration between $\varphi_1$ and $\varphi_3$ effected by the special configuration of the cam surface 12 retains the roller 13 so that the linkage is displaced, at the angular position $\varphi_3$ of the cam 11, relatively to the position of the linkage at $\varphi_1$, the displacement amounting to $a$. At this moment ($\varphi_3$) the face 43 reaches the edge 44 whereby both, the hook and the hook receiver move at the same speed as seen in Fig. 4.

For the reason explained supra a knock is avoided and the acceleration $\varphi_2$ to $\varphi_3$ imparted to the hook 26 by the cam surface 12 corresponds to the speed of the hook receiver 27. There is no rebounding of the face 43 from the edge 44 and no vibration. The subsequent deceleration between $\varphi_3$ and $\varphi_4$ (portion $Se_4$ of curve $Se$) to the end of the frame stroke (TF in Fig. 1) is transmitted without disturbance from the hook to the hook receiver and to the frame.

The right side of Fig. 4 shows the acceleration, velocity and path conditions when the frame 28, 29 moves from the low position to the raised position. Between the angular positions $\varphi_5$ and $\varphi_7$ of the cam 11 an equalizing zone is provided at the reversal of the driving force at $\varphi_6$. The dash-dot line in Fig. 4 shows a simplified acceleration conditions which may be used instead of the curve P.

Figure 5:
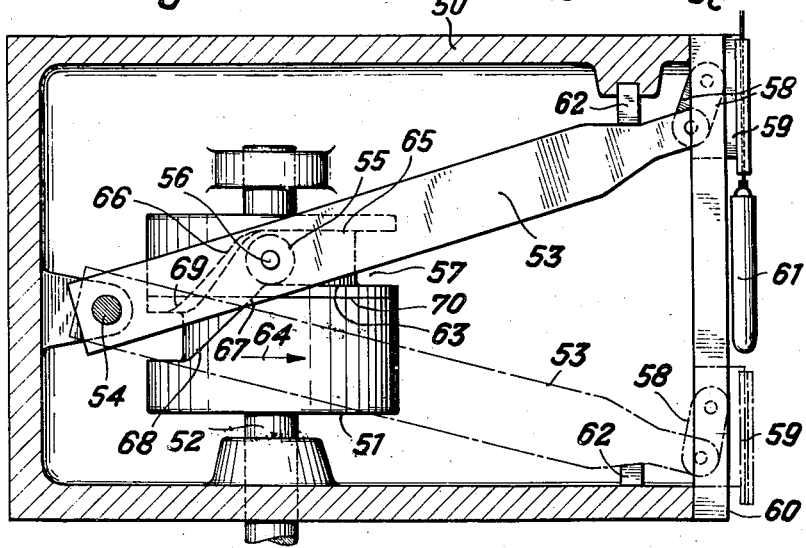
Fig. 5 is a diagrammatic part sectional plan view of a cam drive as applied to a weft thread presenting mechanism in a loom for weaving.

Fig. 5 is a top view of a picking mechanism of a gripper shuttle loom. A groove cam 51 is mounted on a shaft 52 which is rotatably supported in a casing 50. The shaft is driven by a main loom drive shaft, not shown. A lever 53 swinging on a pin 54 is provided with a cam follower roller 55 rotating on a pin 56 and rolling in a groove 57 of the cam 51.

The lever 53 drives, through a link 58, a thread presenter 59 which is guided to move on a straight line at the front face 60 of the casing 50 for presenting a weft thread to a shuttle 61.

Figure 6:
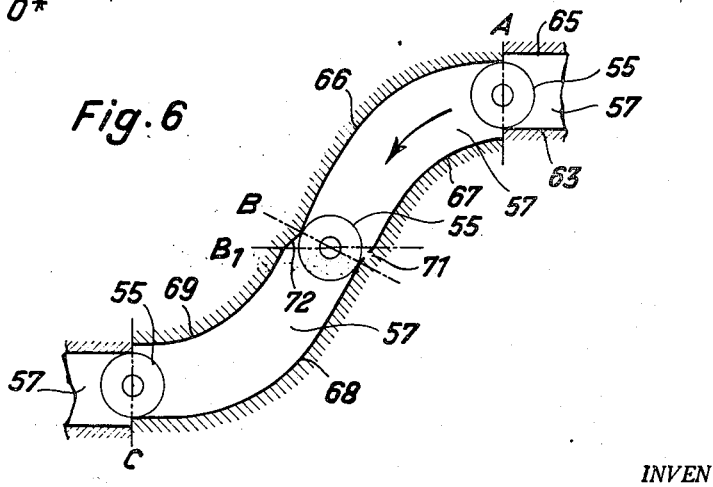
Fig. 6 is a diagrammatic illustration of the cam groove of the cam forming part of the mechanism shown in Fig. 5.

The thread presenter 59 is shown in the position for presenting a weft thread to a shuttle whereby the lever 53 rests on an abutment 62. The roller 55 rests therefore on the side wall 63 of the cam groove 57. The cam rotates in the direction of the arrow 64. A small clearance must be provided between the roller 55 and the groove 57. The roller 55 is therefore spaced from the wall 65 of the groove 57. In the illustrated position the roller is at the beginning of the groove curve which moves the lever 53 into its second end position, and, normally, would not reach the wall 66 before a certain angular movement of the cam. The driving force is changed at the beginning of the groove curve whereby the lever 53 must first be accelerated by the curve 66 until a mid position whereupon the cam portion 68 (Fig. 6) guides the roller for decelerating the lever 53. There is a change of direction of the driving force not only at A in Fig. 6 but also at B and C. The lever 53 engages an abutment 62 when in the second extreme position so that the thread presenter 59 stands still and does not vibrate when receiving a cut off weft thread end.

The side walls of the cam groove 57 are offset at the positions A, B and C relatively to the wall portions which have previously guided the roller 55 before the change of direction of the driving force. Since, with a groove cam, only the minor clearance between the roller 55 and the groove 57 must be counteracted no intermediate cam portion longitudinally of the groove need be provided and it is sufficient to make the intermediate cam portion in a plane at a right angle to the longitudinal axis of the groove.

At the location B the wall 66 may be offset relatively to the wall 69 by splitting the cam along a cross section 70 and relatively rotating the cam halves in order to completely or partly counteract the undesirable influence of the cam and roller clearance when the direction of the driving force is changed. The section 70 is represented by a line $B_1$ in Fig. 6 which line is inclined to the longitudinal axis of the groove 57. It is therefore necessary to provide intermediate cam surfaces 71, 72.

The transition surfaces $Sc_2$ and $Sd_2$ (Fig. 3) are preferably so shaped that the acceleration effected by these surfaces does not exceed the acceleration effected by the main cam surface portions. It is of advantage to make the radii of the transition curve equal to or greater than the smallest radius of the main cam curve.

I claim:

1. A drive for moving a mass by forces consecutively acting on the mass in opposite directions, including a cam having a cam surface, a follower engaged by said cam and receiving driving forces from said cam consecutively acting in opposite directions, and a linkage operatively connecting said follower to the mass to be moved, said linkage having clearances and elasticity causing a change of length of the linkage at each reversal of the direction of the driving force, said cam surface having a continuous first portion for applying a force to the mass acting in a certain direction on the mass, said cam surface having a second continuous surface portion for subsequently applying a force to the mass acting in the opposite direction, said second surface portion being shaped to form a continuation of said first surface portion but being offset with respect to said first surface portion, the offset being in a direction counter to the direction of the force acting on the follower and corresponding to at least a part of said change of length of said linkage when the direction of the driving force is reversed.

2. A drive as defined in claim 1 wherein said change of length of said linkage amounts to a certain percentage of the path of said mass between two extreme positions and the extent of said offset amounts to at least a part of the same percentage of the path of said follower between two extreme positions corresponding to the two extreme positions of the mass.

3. A drive as defined in claim 1 including means operatively connected to said linkage for pressing said follower against said cam.

4. A drive as defined in claim 1 wherein said cam is a grooved cam.

5. A drive as defined in claim 1 including a transition cam surface portion interposed between said offset surface portions, said transition surface portion effecting an acceleration of the mass which is not greater than the acceleration of the mass effected by said first cam surface portion.

6. A drive according to claim 5 wherein the radii of said transition surface portion are at least as great as the smallest radius of said first surface portion.

7. A drive as defined in claim 1 wherein said cam is cylindrical and has a groove having two opposed cam surfaces for guiding said follower therebetween, said cam being split into two parts in a plane normal to the cylinder axis and extending through said surfaces where said surfaces effect change of the direction of the driving force, said parts being angularly displaced to produce the offset.

8. A mechanism of the type described having, in combination, an operated part, a cam, a follower engaged by said cam, and a linkage between said follower and said operated part and having clearances and elasticity effecting a change of length of said linkage upon a reversal of the force acting thereon, said cam having a first surface portion for applying a force to said follower acting in a certain direction, said cam having a second surface portion for applying a force to said follower acting in the opposite direction, said cam having a third surface portion interposed between said first surface portion and said second surface portion for displacing said follower, prior to the engagement of said follower by said second surface portion, to an extent corresponding to at least a portion of the change of length of said linkage upon reversal of the direction of the force due to the clearances and elasticity of said linkage.

References Cited in the file of this patent

UNITED STATES PATENTS

| | | |
|---|---|---|
| 1,175,687 | Birkigt | Mar. 14, 1916 |
| 1,635,304 | Baster | July 12, 1927 |
| 2,070,633 | Topham | Feb. 16, 1937 |